June 18, 1968 J. A. FORBES 3,389,340

COMMON MODE REJECTION DIFFERENTIAL AMPLIFIER

Filed Sept. 30, 1964

INVENTOR
JAMES A. FORBES

BY Sughrue, Rothwell, Mion, Zinn & Macpeak
ATTORNEYS

United States Patent Office 3,389,340 Patented June 18, 1968

3,389,340
COMMON MODE REJECTION DIFFERENTIAL AMPLIFIER

James A. Forbes, Hatboro, Pa., assignor, by mesne assignments, to Robertshaw Controls Company, Richmond, Va., a corporation of Delaware Filed Sept. 30, 1964, Ser. No. 400,313
6 Claims. (Cl. 328—155)

ABSTRACT OF THE DISCLOSURE

A differential amplifier circuit having a D.C. input level and a proportional A.C. to ground output rejects input common mode errors. The two input terminals to the differential amplifier contain respectively a chopped D.C. input plus common mode error and common mode error alone. The terminal containing common mode error alone is applied to a feedback circuit which puts the common mode error in the proper phase for subtraction from the signal on the other terminal.

This invention relates to means for separating a specific signal component from a complex wave and particularly to means for segregating a data signal from a D.C. modulated carrier wave.

One field of application for my invention is the amplification of minute D.C. signals such as occur in process control. Because of certain difficulties which inhere in the direct amplification of a D.C. voltage, it has been customary to convert the D C. input signal into an A.C. signal which can be readily amplified and then, if desired, converted back to a D.C. signal. The initial step of converting the D.C. input signal into a carrier wave modulated by the D.C. signal is customarily performed by means of a chopper using a semiconductor device as a switch for "chopping" the D.C. signal. This entails its own problems chief of which is the appearance of a spiked square wave of carrier frequency, which is several orders larger than the data signal and is due to drive feed-through and other causes.

Another object is to provide a circuit which will accept a D.C. modulated carrier wave embodying extraneous components and deliver at its output an A.C. signal which is approximately proportional to the D.C. component of the input signal.

Accordingly, it is an object of my invention to provide a circuit which will convert a D.C. data signal into a modulated carrier wave signal and deliver at its output an A.C. signal which is proportional in amplitude to the D.C. data signal.

Another object is to provide a differential amplifier circuit capable of accepting two A.C. signals varying with respect to a common reference point, one of which signals is composed of a data signal, plus a common mode component corresponding to the other signal, and of delivering an A.C. output which is proportional only to the data signal component of the first mentioned signal.

In accordance with the first object stated the invention comprises a converter circuit in which; while converting a D.C. signal into an A.C. signal varying with respect to a reference voltage point in accordance with the sum of the signal voltage and other voltages, a second, common mode signal is generated which is instantaneously equal to the sum of said other voltages. The two signals are fed to a differential amplifier where the common mode signal provides a pedestal with respect to the common reference voltage point, for an amplifier having a control electrode to which the other signal containing the data signal is fed. Thus, the output from the amplifier is an A.C. signal proportional to the data signal component of the input to the differential amplifier.

In accordance with the second and third objects stated the differential amplifier includes a feedback loop by which the common mode signal is amplified and fed, with phase adjusted to agree with the signal at the common mode terminal of the differential amplifier, to a voltage divider; from which a pedestal voltage, instantaneously equal, approximately, to the common mode signal, is tapped off to one terminal of a difference signal amplifier. A control terminal of the latter amplifier receives the data containing signal and the data signal is delivered at an output terminal of the difference signal amplifier. The feedback loop thus acts as a high impedance isolating means between the common mode terminal of the differential amplifier and the pedestal terminal of the difference signal amplifier.

The foregoing and other objects, features and advantages of the invention will be apparent from the following more particular description of a preferred embodiment of the invention, as illustrated in the accompanying drawings.

Figure 1:
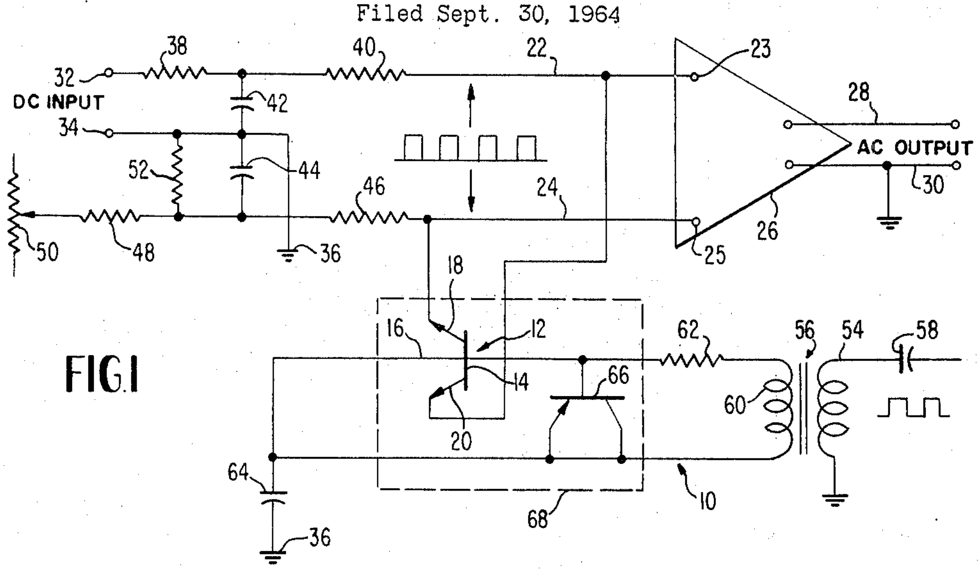
FIGURE 1 is a schematic diagram of a deviation amplifier embodying the invention, with the differential amplifier portion shown in block diagram form.

The illustrative embodiment of the invention shown in the drawing includes a chopper for converting a D.C. microvolt signal to a carrier frequency square wave, and a differential amplifier circuit for separating from the square wave a signal component which is proportional to the D.C. microvolt signal.

Referring now to the drawing, the over-all chopper circuit, designated generally by reference numeral 10, includes a four-terminal semiconductive device 12 having a base terminal 14, a collector terminal 16 and a pair of emitter terimnals 18 and 20. The emitter terminals are connected across the two input leads 22 and 24 extending to input terminals 23 and 25, of a differential amplifier 26. Very briefly, the amplifier 26 produces an output signal across leads 28 and 30 extending from output terminals 28 and 30, which is proportional to the instantaneous difference between the two input signals applied over leads 22 and 24 and which, in a manner to be explained, excludes any extraneous signals, such as common-mode signals, present in both input signals.

A D.C. input signal is applied to the chopper circuit 10 at terminals 32 and 34, the latter being grounded at 36. Terminal 32 is connected to the input lead 22 of the differential amplifier through a pair of series resistors 38 and 40, of which resistor 38 represents part of the impedance of the source of D.C. input signals. A first capacitor 42 is connected between the junction point of resistors 38 and 40 and ground, and a second capacitor 44, equal in value to capacitor 42, is connected between ground and the junction point of resistors 46 and 48. Resistor 46 is equal in value to resistor 40 and is tied to the input lead 24 of the differential amplifier, while resistor 48 is connected to the adjustable tap of a balancing potentiometer 50 connected between the positive and negative terminals of a D.C. voltage source. A resistor 52 is connected in parallel with capacitor 44 between ground and the junction point of resistors 46 and 48.

A source of alternating drive signals for the chopper, which may be a square wave derived from a free-running multivibrator, is coupled to the grounded primary 54 of an isolating transformer 56 through a filter capacitor 58. The output from the secondary 60 of the transformer is connected across the base terminal 14 and the collector terminal 16 of the semiconductive device 12 through a resistor 62, and the collector terminal 16 is also coupled to ground at 36 through an isolating capacitor 64. A PNP limiting transistor 66 has its base connected to the base of the semiconductive device and its emitter and collector connected to the collector of the semiconductive device, and both the transistor 66 and the semiconductive device 12 are enclosed within a closely regulated, constant temperature chamber, generally indicated by the broken line 68.

The operation of the chopper circuit 10 will now be described. Essentially, the square wave drive signal coupled through the transformer 56 renders the semiconductive device 12 alternately conductive and nonconductive. When a forward biasing potential is applied between the base and collector terminals the device becomes conductive, in which state the impedance between the two emitter terminals is extremely low and may be generally considered to be a short circuit. On the other hand, when the base-collector terminals are subjected to a reverse biasing potential the device becomes non-conductive, in which condition the impedance between the two emitter terminals is almost infinite and may be thought of as an open circuit. The semiconductive device 12 is thus made to act as an alternate on-off type of switch under the control of the drive signal.

If the means for alternately short circuiting and open circuiting the leads 22 and 24 were an ideal switch, not affected by extraneous influences, then the differential amplifier 26 would alternately see a voltage difference across its input terminals equal to the applied D.C. input signal, to zero, to the D.C. input, such alterations having a frequency corresponding to that of the opening, closing, and opening of the switch.

Unfortunately, this ideal type of operation is never achieved in actual practice because the semiconductive device 12 and its associated control circuitry produce numerous error signals that would, if not otherwise compensated for, impress themselves upon the input leads of the differential amplifier. My copending application Ser. No. (D 3094A), 400,520 filed on Sept. 30, 1964 now Patent No. 3,339,087, issued Aug. 29, 1967, describes various means to compensate for or minimize the effects of such error signals, particularly those of a difference mode type, which results in a greatly improved signal-to-noise ratio, even when handling input signals of comparatively low magnitude.

In addition to such difference mode error signals there are common mode error signals, to be described herein, which are substantially eliminated by means of the present invention. These common mode error signals are of a kind which are transmitted from the chopper circuit in parallel through the circuit branches containing the respective impedance pairs 40, 42 and 46, 44. By matching the impedances in the two branches of this circuit the error signals at the input leads 22 and 24, referred to ground, are made instantaneously equal. Thus, with other error sources compensated in the manner described in my copending application Ser. No. 400,520, above referred to, the difference signal appearing between the input leads 22 and 24 is a square wave of the form shown in FIGURE 1, proportional to the D.C. data signal at terminals 32 and 34.

The principal sources of common mode error signals will now be described. A large source of common mode error signal stems from switching transients developed in the semiconductive device 12 attributable to the inter-electrode capacitance inherently present between the base of the semiconductive device and each of the emitters. In essence, these capacitances are charged during the off half-cycles of the device and discharge through the emitter-base diodes during the on half-cycles, thus delivering spike wave forms concurrently to the amplifier input leads 22 and 24 that are basically differentiations of the square wave drive signal pulses.

If these two spike signal transients can be made to have identical wave forms in both amplitude and phase, then the net difference between them will always be zero but they will remain as part of the common mode error signals. The difference is minimized by using a semiconductive device 12 having matched emitter-base capacitance values and by using matched impedances in the circuit branches from each input terminal of the amplifier to ground.

An additional common mode error voltage stems from the switching transients flowing in the transformer inter-winding capacitance. The drive source for the chopper is capacitatively coupled to the transformer secondary by way of this capacitance. To prevent currents from this source from being forced to ground through the chopper emitter-base diodes the bypass condenser 64 is provided. However, the rather large A.C. voltages developed across the emitter collector junctions are coupled by this condenser to the matched impedance paths associated with the respective leads 22 and 24 and appear as equal voltages across resistors 40 and 46.

In the preceding discussion of the chopper and the input circuit it has been assumed that no error existed if the voltage between the input terminals 23 and 25 was zero. In most cases, however, while accomplishing this condition, a large voltage, either square wave or transient spike will be produced between each input terminal 23 and 25 and ground 36. The amplifier 26 must respond readily to the voltage difference of the two signals applied to input terminals 23 and 25, measured with respect to a common point (ground 36), but must at the same time reject any voltage common to the signals. The terminals 23 and 25 look into respective branch circuits to ground 36 of matched impedances, resistors 40 and 46 and capacitors 42 and 44, but the circuit branch from terminal 23 has across its capacitor 42 a D.C. input signal. Thus, the terminals 23 and 25 have a common mode signal transmitted to them from the chopper, but the signal at terminal 23 has an additional component derived from the modulating D. C. data signal.

Figures 2, 3A:
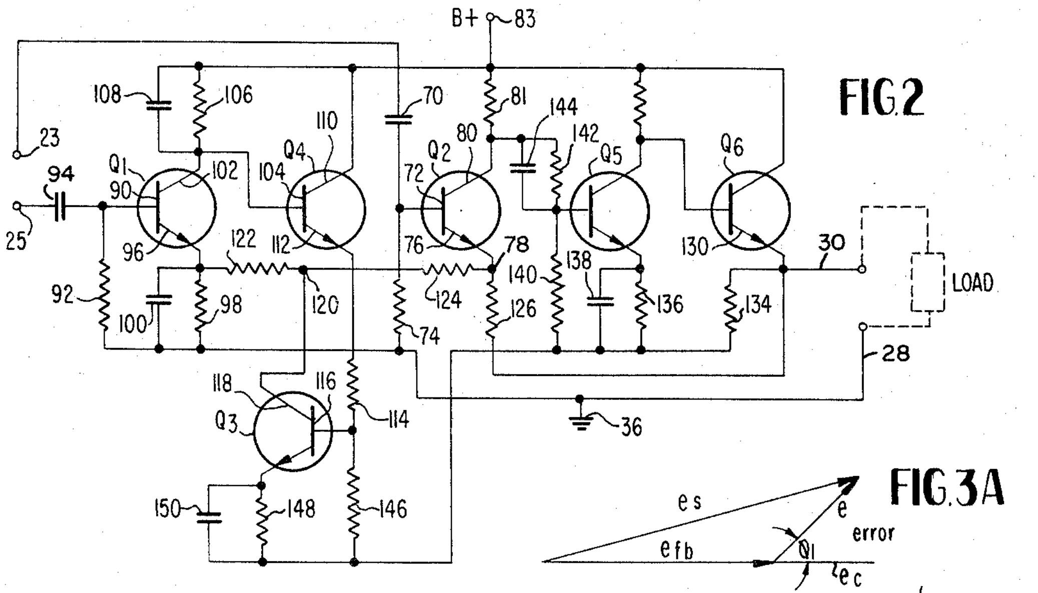
FIGURE 2 is a wiring diagram of the differential amplifier shown in FIGURE 1.
FIGURES 3A and 3B are voltage diagrams.

Turning now to a description of the differential amplifier circuit shown in FIG. 2, the signal at terminal 23 is transmitted through a capacitor 70 to the base 72 of a transistor Q2, the base being connected to ground 36 by a resistor 74. The emitter 76 of transistor Q2 is connected to a voltage reference point 78, which will be referred to in more detail presently. The collector 80 of transistor Q2 is connected by resistor 81 to B+ terminal 83 of a power supply (not shown) and coupled through two amplifying stages represented by transistors Q5 and Q6 to output terminal 28 of the differential amplifier. The other output terminal 30 is connected to ground 36. Any desired load may be connected across these output terminals, as represented in dotted lines, such as further amplifying means, indicating means, or other utilization means.

In accordance with the principle of the invention, the reference point 78 is to have an instantaneous voltage at all times approximately equal to the voltage with respect to ground on terminal 25. This voltage is derived from a feedback loop circuit comprising transistors Q1, Q3 and Q4. The base 90 of transistor Q1 is connected by resistor 92 to ground 36 and receives the common mode signal from terminal 25 through capacitor 94. Emitter 96 of transistor Q1 is connected to ground by a resistor 98 and a capacitor 100, the function of which will be described later. Collector 102 of transistor Q1 is connected to base 104 of transistor Q4 and to B+ terminal 83 by resistor 106 and capacitor 108. Collector 110 of transistor Q4 is connected directly to B+ terminal 83, while its emitter 112 is connected through resistor 114 to base 116 of transistor Q3. Collector 118 of transistor Q3 is connected to the junction point 120 of two resistors 122 and 124. The opposite end of resistor 122 is connected to the emitter 96 of transistor Q1, completing the feedback loop. The resistor 124 forms one part of a voltage divider consisting of resistors 124 and 126, the lower end of resistor 126 being connected to the output terminal 28 and emitter 130 of the emitter follower transistor Q6. The reference voltage point 78 is located on voltage dividers 124, 126, at a position selected in a manner to be described presently.

The purpose of the transistor Q1 and the feedback loop comprising transistors Q4 and Q3 is to maintain at the reference voltage point 78 to a voltage which varies with and is approximately equal to the common mode signal applied to input terminal 25. The signal present at the base of Q1 is amplified by the loops Q1, Q4, Q3, to produce a voltage at the collector 118 of Q3 which is greater than the input voltage to terminal 25. If the phase of this voltage at the collector of Q3 is identical to that of the driving signal applied to the base of Q1, it is possible to find a point along the voltage dividers 124, 126, where the voltage is approximately equal to the driving signal. Choosing this point for connection of the emitter of Q2 means that Q2 will see substantially none of the common mode signal and will produce no common mode output.

Figure 3B:
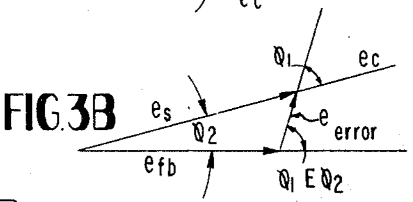
Figure 4:
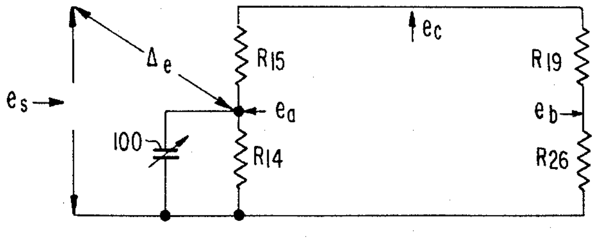
FIGURE 4 is an equivalent circuit diagram of a portion of the differential amplifier circuit pertaining to a feedback loop.

The requirement of zero phase difference between the voltage of point 120 and the input signal can be accomplished, at reasonable frequencies, by choosing high frequency cut-off transistors with low collector-base capacitance to minimize the internal phase shift and then trimming the feedback voltage returned to the emitter 96 of Q1 until it slightly lags the voltage at point 120. This can be seen by considering the phase diagrams in FIGS. 3A and 3B and the equivalent circuit diagram in FIG. 4. If the capacitor 100 were not present and a purely resistive feedback circuit were used, the feedback voltage would be in phase with current pumped to point 120. The feedback voltage would then slightly lag $e_s$, by an amount necessary to generate $e_{error}$. As the diagram, FIG. 3A, indicates, no matter how high the loop gain, an error must exist because of loop phase shift. Now, if a capacitor 100 of suitable value is added, say about 30 to 40 MMF, the voltage returned to the emitter 96 of Q1 will be caused to lag the voltage at point 120; thereby the voltage $e_c$ at point 120 will be advanced, as shown in FIG. 3B, to fall in line with $e_s$. In the diagrams, FIGS. 3A and 3B, $\phi_1$ is the loop phase shift, $\phi_2$ is that which has been added by capacitor 100 to advance $e_c$. The feedback voltage, $e_{fb}$, will be almost exactly in the original position, but the error voltage $e_{error}$ will advance in phase by the amount that it is desired to advance $e_c$. The significance of the voltage points shown in FIGS. 3A and 3B is shown in the equivalent circuit diagram FIG. 4.

The differential amplifier is required to suppress the feed-through spikes of the chopper plus the pedestal voltages and the drive feed-through appearing on capacitor 64. The sum total of this is a square wave of carrier frequency approximately 1 mv. peak to peak in amplitude, plus spikes of several millivolts. A common mode rejection ratio of 100,000:1 would suppress the pedestal voltage to 0.1 microvolt equivalent signal. This can be achieved by using transistors having a typical current gain of 25 per transistor; the ratio of the error voltage, $e_{error}$, in FIG. 3B to the signal voltage $e_s$ would then be $10^{-5}$. For one unit of input, the voltage appearing at the junction of resistors 98 and 122, with reference to ground, would be .99999 units. By a simple calculation, using 1% nominal resistors, it can be shown that the ratio at the reference point 78 is substantially the same; that is, the voltage at point 78 is approximately equal to .99999$e_s$.

It will be observed that, because of impedance matching requirements the base of resistors 126 has not been tied directly to ground, but rather to the emitter of transistor Q6. However, the error caused by this difference is negligible. The difference gain of the amplifier is determined primarily by the ratio of resistors 126 and 124.

A circuit conforming to the above description was built and successfully tested. The values of components used in the D.C. to A.C. conversion portion of the circuit are given in my abovementioned copending application. The following table gives the values of components of the differential amplifier portion of the circuit, using the reference numbers shown in FIG. 2:

| | | |
|---|---|---|
| Transistors: | | |
| Q1 and Q2 matched | | 2n 1505–1 |
| Q4 and **6** | | 2n 1505–5 |
| Q3 and Q5 | | 2n 1375–1 |
| Capacitors: | | |
| **100** | MMF | 20 |
| **108** | MMF | 220 |
| **144** | mfd | .1 |
| **70, 94, 150** | mfd | .5 |
| **138** | mfd | 2.0 |
| Resistors: | | |
| **122, 124** | | 200Ω |
| **81, 114** | | 15K |
| **148** | | 16K |
| **136, 146** | | 18K |
| **132** | | 20K |
| **134** | | 30K |
| **106, 140, 142** | | 33K |
| **74, 92** | | 51K |
| **98, 126** | | 100K |

It will be seen that the invention provides a differential amplifier which is capable of separating from a complex signal a common signal component and producing an output proportional to the difference signal only. The invention also provides means for converting a low amplitude D.C. data signal into an amplified A.C. equivalent, which includes means for eliminating all extraneous components which appear in the circuit due to the nature of the chopper required for conversion of the D.C. input signal to an A.C. signal.

While there have been shown and described and pointed out the fundamental novel features of the invention as applied to the preferred embodiment, it will beunderstood that various omissions and substitutions and changes in the form and details of the device illustrated and in its operation may be made by those skilled in the art without departing from the spirit of the invention. It is the intention, therefore, to be limited only as indicated by the scope of the following claims.

I claim:

1. In a differential amplifier circuit for delivering an A.C. output signal proportional to a difference component of an input signal supplied from another circuit which delivers first and second signals varying with respect to a common voltage reference point, said first signal being a common mode signal and said second signal being the sum of said common mode signal and said difference component;

(1) a nonlinear amplifier having a control electrode and two other electrodes;

(2) impedance means connecting a first one of said other electrodes to said common voltage reference point;

(3) means including a first input terminal for applying said second signal between said control electrode and said common voltage reference point;

(4) means for applying to said first one of said other electrodes a voltage which varies with respect to said common voltage reference point so as to be instantaneously approximately equal to said common mode signal, said last mentioned means including a second input terminal to which said first signal is applied and high impedance amplifying means coupling said second input terminal to said first one of said other electrodes; and (5) output means including an output terminal coupled to the second one of said other electrodes of said nonlinear amplifier, for delivering said A.C. output signal to a load device connected between said output terminal and said common voltage reference point.

2. A differential amplifier circuit as described in claim 1, wherein said high impedance circuit means comprises an amplifying loop, and voltage divider means coupling said loop to said first one of said other electrodes of said nonlinear amplifier.

3. A differential amplifier as described in claim 2, wherein said amplifying loop includes a second nonlinear amplifier having three electrodes, one of which is a control electrode coupled to said second input terminal, the other two of said electrodes being series-connected in said loop, and trimming means connected to one of said other two electrodes of said second nonlinear amplifier, to synchronize the signal applied to said first one of said other electrodes of said first mentioned nonlinear amplifier with the signal applied to said second input terminal.

4. In a D.C. to A.C. amplifier;

(1) a D.C. to A.C. conversion circuit comprising:

(a) a pair of D.C. input terminals, a first one of which is connected to a common voltage reference point, (b) chopper means, and (c) a pair of matched-impedance signal converting circuit branches respectively connecting said chopper means to respective ones of said terminals, whereby two A.C. signals are generated at the ends of said circuit branches connected to said chopper means, the signal generated at the remote end of a first one of said circuit branches connected to said first D.C. input terminal being a common mode signal, and the signal generated at the remote end of the second one of said circuit branches being the sum of said common mode signal and a component derived from a D.C. signal applied between said D.C. input terminals; and (2) a differential amplifier circuit comprising:

(a) two A.C. input terminals respectively connected to the chopper-connected ends of said converting circuit branches, whereby a first one of said A.C. input terminals receives said common mode signal and the second one of said A.C. input terminals receives said sum signal, (b) two A.C. output terminals, a first one of which is connected to said common voltage reference point, (c) a nonlinear amplifying device having a control electrode and two other electrodes, (d) circuit means connecting a first one of said other electrodes to the second one of said A.C. output terminals, (e) circuit means coupling the second one of said A.C. input terminals to said control electrode of said nonlinear amplifier, (f) and high impedance circuit means coupling the first one of said A.C. input terminals to the second one of said other electrodes of said nonlinear amplifier, for supplying to the latter a signal approximately equal in phase and amplitude to said common mode signal.

5. A D.C. to A.C. amplifier as described in claim 4, wherein said high impedance circuit means comprises an amplifying loop, and voltage divider means coupling said loop to the second one of said other electrodes of said nonlinear amplifier.

6. A D.C. to A.C. amplifier as described in claim 5, wherein said amplifying loop includes a second nonlinear amplifier having three electrodes, one of which is a control electrode coupled to said first one of said A.C. input terminals, the other two of said electrodes being series connected in said loop, and trimming means connected to one of said other two electrodes of said second nonlinear amplifier, to phase shaft the signal applied to the second one of said other electrodes of said first mentioned nonlinear amplifier to coincide in phase with the signal applied to said first one of said A.C. input terminals.

References Cited

UNITED STATES PATENTS

| | | | |
|---|---|---|---|
| 3,046,417 | 7/1962 | Garcia | 328—146 X |
| 3,238,383 | 3/1966 | Falk | 307—88.5 |
| 3,294,961 | 12/1966 | Hose | 307—88.5 X |

JOHN S. HEYMAN, *Primary Examiner.*